No. 858,881. PATENTED JULY 2, 1907.
E. R. LETTERMAN.
COMBINED REEL CLAMP AND FINGER GRIP.
APPLICATION FILED APR. 2, 1906.
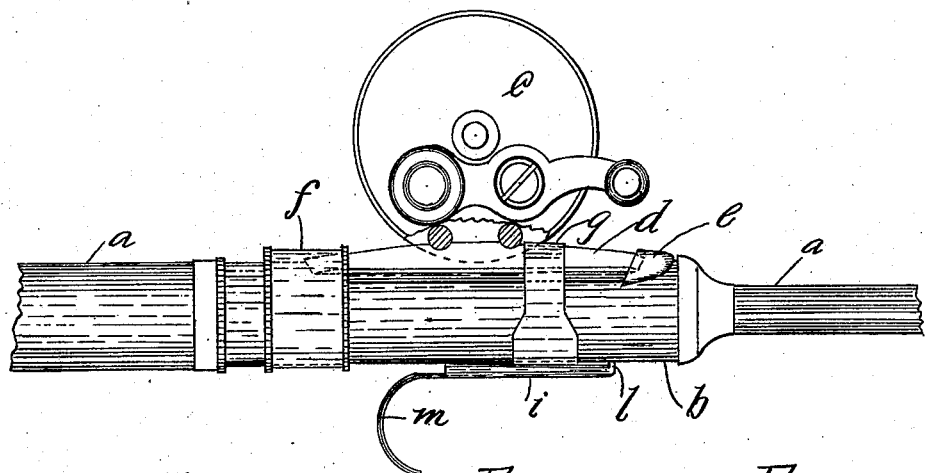
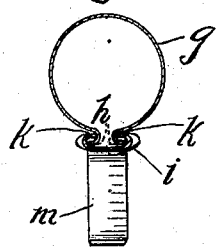 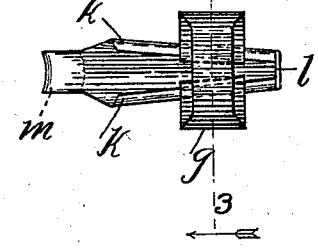 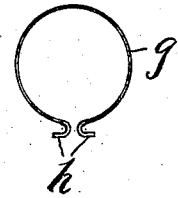
Witnesses.
A. G. Scott
Ethel M. Jones.
Inventor
Edmund R. Letterman
By Harry Irwin Cromer
Attorney

UNITED STATES PATENT OFFICE.

EDMUND R. LETTERMAN, OF CHICAGO, ILLINOIS.

COMBINED REEL-CLAMP AND FINGER-GRIP.

No. 858,881.  Specification of Letters Patent.  Patented July 2, 1907.

Application filed April 2, 1906. Serial No. 309,451.

*To all whom it may concern:*

Be it known that I, EDMUND R. LETTERMAN, a citizen of the United States, residing in Chicago, in the county of Cook and the State of Illinois, have invented certain new and useful Improvements in a Combined Reel-Clamp and Finger-Grip for Fishing-Rods.

This invention relates to that class of finger supports and reel connections for fishing rods having a securing ring member adapted to encircle the reel plate and provided with a finger supporting member mounted upon and adjustable with relation to such ring member, and adapted to tighten or loosen the securing ring member.

The principal object of the invention is to provide a simple economical and efficient finger support and reel connection for fishing rods.

Further objects of the invention are to provide a securing ring member adapted to form a connection between the reel plate and reel seat, and a finger supporting key member adapted to tighten and hold the securing ring member in clamping engagement with the reel plate and reel seat and to readily tighten or release such clamping ring member when desired, either for the purpose of adjusting the finger supporting member or finger rest to any desired position, or for the purpose of removing the reel.

Other and further objects of the invention will appear from an examination of the drawings and the following description of the claims.

The invention consists in the features, combinations and details of construction hereinafter described and claimed.

In the accompanying drawings, Figure 1 is a view in elevation of a portion of a fishing rod provided with my improved finger supporting and reel plate and reel seat connecting mechanism; Fig. 2, a plan view of the securing ring member and the ring tightening and finger supporting member or key; Fig. 3, a sectional view in elevation taken on line 3 of Fig. 2 looking in the direction of the arrow, and showing the finger supporting key with its depending finger supporting or hook portion, and Fig. 4, a detail view in elevation of the securing ring.

In constructing a finger support and reel-holding device for fishing rods in accordance with my improvements, I provide a fishing rod *a*, and a metallic reel seat *b* which may be of any ordinary and well known form. The reel seat is mounted upon the rod in any desired manner, and a reel *c* having a preferably tapered reel plate *d* is mounted upon the reel seat. One end of the reel plate extends into a socket *e* upon the reel seat and the opposite end is held in place by means of a sliding sleeve or ring *f*.

In order to provide a finger support and reel connection which is readily adjustable, and adapted to be readily placed in operative position or removed, a se- curing ring *g*, in the form of a split or compressible metallic ring of thin sheet metal is mounted upon and partially or wholly encircles the reel plate and reel seat. This securing ring member fits snugly upon the slightly tapered or irregular surface portions of the reel plate and is adapted to greatly increase the rigidity and security of the connection between the reel plate and seat. The lower or end portions of this ring are of greater width than the upper reel plate engaging portion, and are provided with integral flanges *h* which are in movable relation to each other and adapted to permit the ring to be compressed or tightened so as to fit snugly upon any desired portion of the reel plate and reel seat. The reel plate is preferably tapered and the securing ring member should be capable of being readily adjusted to a diameter corresponding to the form or size of the parts encircled thereby. It is also desirable that the parts have as few projections or sharp exposed angles as possible so as to present curved or smooth surface portions adapted to prevent chafing or injury to the fingers when the rod is used. It is also desirable, as already suggested, that the finger support be readily adjustable to any desired position with relation to the reel, so that the finger of the operator will be supported in the most advantageous position in the act of casting. In order to accomplish this, I provide a combined finger support and key or ring tightening member *i*, the main body portion of which is tapered longitudinally and curved transversely as shown in Figs. 2 and 3. This combined finger supporting and key member is provided at its opposite edges with flanges *k* which extend in oblique relation to each other and are in sliding engagement with the compressible flanged portions of the securing ring.

One end of the key member is provided with a stud or flange *l* which engages the surfaces of the reel seat on one side of the securing ring, and the opposite or hooked end of the main body portion of the key preferably engages the reel seat on the opposite side of the securing ring. The relatively oblique ring engaging flanges or edges of the tapered key being in sliding engagement with the compressible ring tend to tighten the ring by drawing its flanged or end portions together as the key is drawn in the direction of its wide end. The movement of the key in the opposite direction with relation to the securing ring will, of course, release the ring and permit it and the supporting member or key to be readily adjusted to any desired position or removed. The wide end of the main body portion of the ring-tightening or key member is provided with a finger supporting portion or rest *m* preferably in the form of a hook which projects outward from the main body portion of the key member on the lower or opposite side from the securing ring, as shown in Fig. 1. This finger supporting hook or rest is preferably integral with the main body portion of the finger supporting and locking member or key, and is adapted to form a support for the finger so as to prevent the hand from slipping and enable the operator to manipulate the reel more freely and efficiently in casting. The hook also enables the necessary force to be exerted in tightening the securing ring, and screws or other tightening devices distinct from the finger supporting member are dispensed with. At the same time the facility with which the ring and finger support may be placed in position and adjusted or removed is greatly increased.

I claim:

1. In a combined reel-clamp and finger-grip, the combination of a compressible securing ring member, and a ring-securing key member mounted upon and movable with relation to such compressible securing ring member and provided with a projecting finger supporting hook portion.

2. In a combined reel-clamp and finger-grip, the combination of a split securing ring member having flanged end portions, and a tapered key member mounted in sliding engagement with such flanged portions of the securing ring member and provided with a depending finger supporting hook portion.

3. In a combined reel-clamp and finger-grip, the combination of a compressible securing ring member, and a key member having a depending finger supporting hook portion, and provided with relatively oblique ring engaging portions in sliding engagement with the compressible ring member for tightening and releasing it.

4. In a combined reel-clamp and finger-grip, the combination of a split securing ring member provided with flanged portions movable with relation to each other, and a locking member provided with flanges extending in oblique relation to each other and in sliding engagement with the flanged portions of such ring member and having an integral depending hook portion for forming a support or rest for the finger of the operator.

5. In a combined reel-clamp and finger-grip, the combination of a reel seat, a reel plate mounted thereon, a split ring mounted in engagement with such reel plate and reel seat, and a key member mounted in sliding engagement with such split ring member and provided with a depending finger supporting hook portion.

6. In a combined reel-clamp and finger-grip, the combination of a reel seat, a reel plate mounted thereon, a split ring mounted in engagement with such reel plate and seat and provided with flanges movable with relation to each other to tightened and releasing position, and a key member having a depending finger supporting hook portion and provided with relatively oblique ring engaging edge portions in sliding engagement with the flanged portions of such split ring.

EDMUND R. LETTERMAN.

Witnesses:
VICTOR REMY,
ETHEL M. JONES.